United States Patent
Rosemarine

(10) Patent No.: US 12,380,200 B2
(45) Date of Patent: Aug. 5, 2025

(54) SYSTEM, DEVICES AND/OR PROCESSES FOR ASSIGNMENT, CONFIGURATION AND/OR MANAGEMENT OF ONE OR MORE HARDWARE COMPONENTS OF A COMPUTING DEVICE

(71) Applicant: Arm Limited, Cambridge (GB)

(72) Inventor: Elliot Maurice Simon Rosemarine, London (GB)

(73) Assignee: Arm Limited, Cambridge (GB)

(*) Notice: Subject to any disclaimer, the term of this patent is extended or adjusted under 35 U.S.C. 154(b) by 281 days.

(21) Appl. No.: 18/160,579

(22) Filed: Jan. 27, 2023

(65) Prior Publication Data
US 2024/0256646 A1    Aug. 1, 2024

(51) Int. Cl.
| G06F 21/00 | (2013.01) |
| G06F 9/455 | (2018.01) |
| G06F 9/48 | (2006.01) |
| G06F 21/44 | (2013.01) |
| G06F 21/52 | (2013.01) |

(52) U.S. Cl.
CPC .......... *G06F 21/44* (2013.01); *G06F 9/45558* (2013.01); *G06F 9/4881* (2013.01); *G06F 21/52* (2013.01); *G06F 2009/45587* (2013.01); *G06F 2221/034* (2013.01)

(58) Field of Classification Search
CPC .... G06F 21/44; G06F 9/45558; G06F 9/4881; G06F 21/52; G06F 2009/45587; G06F 2221/034; G06F 21/74
See application file for complete search history.

(56) References Cited

U.S. PATENT DOCUMENTS

| 2007/0106986 | A1* | 5/2007 | Worley, Jr. | G06F 9/45537 718/1 |
| 2014/0379923 | A1* | 12/2014 | Oberg | G06F 21/575 709/226 |
| 2019/0087368 | A1* | 3/2019 | Bhandari | G06F 12/1036 |
| 2020/0159969 | A1* | 5/2020 | Shanbhogue | G06F 13/4282 |
| 2024/0311171 | A1* | 9/2024 | Van Schaik | G06F 21/53 |

* cited by examiner

*Primary Examiner* — William A Corum, Jr.
(74) *Attorney, Agent, or Firm* — Berkeley Law & Technology Group, LLP

(57) ABSTRACT

Briefly, example methods, apparatuses, and/or articles of manufacture are disclosed that may facilitate and/or support assignment, configuration and/or management of one or more hardware components of a computing device.

16 Claims, 8 Drawing Sheets

SYSTEM, DEVICES AND/OR PROCESSES FOR ASSIGNMENT, CONFIGURATION AND/OR MANAGEMENT OF ONE OR MORE HARDWARE COMPONENTS OF A COMPUTING DEVICE

BACKGROUND

Field

The present disclosure relates generally to systems, devices and/or processes for assignment, configuration and/or management of one or more hardware components of a computing device.

Information

Integrated circuit devices, such as processors, for example, may be found in a wide range of electronic device types. Computing devices, for example, may include integrated circuit devices, such as processors, to process signals and/or states representative of diverse content types for a variety of purposes. With an abundance of diverse content being accessible, signal and/or state processing techniques continue to evolve. Many electronic devices, such as any of a wide range of computing device types, may operate, at least in part, in accordance with some form of executable computer program code, such as software and/or firmware. Software compartmentalization may be increasing throughout the computing industry, leading to further development of virtualization technologies to improve security by partitioning a single operating system and its various services, for example. This approach may sometimes be referred to as virtualization-based security.

Additionally, machine learning, for example, is becoming increasingly prevalent throughout the computing industry. Given the above-mentioned increase in software compartmentalization and/or virtualization, it appears that there may be an increasing need for machine learning circuitry, including machine learning accelerators and/or the like, for example, to be securely accessible to virtual machines, secure partitions, etc. Of course, machine learning accelerators are merely one example of a circuit type for which there may be an increasing need to be securely accessible to virtual machines, secure partitions, etc. Software developers, circuit designers, system designers and/or others may face challenges in providing such accessibility in this evolving computing landscape.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
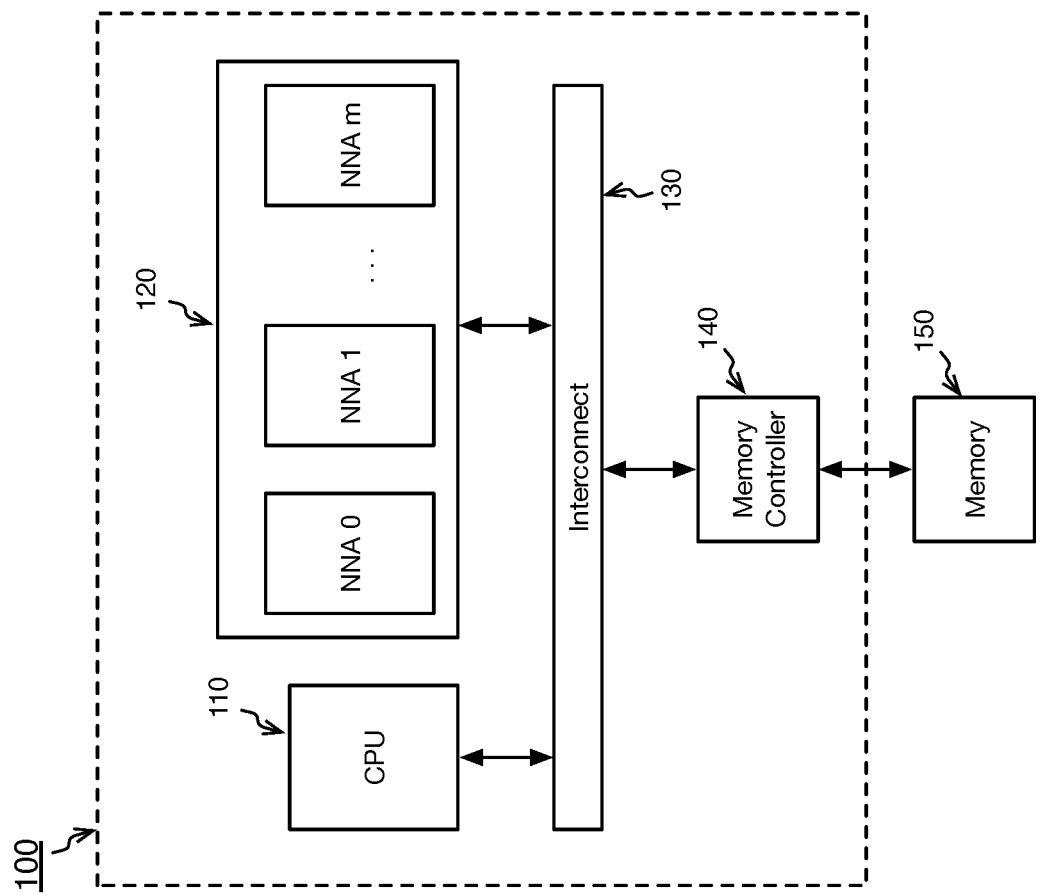
FIG. 1 is a schematic block diagram depicting an example computing device, in accordance with embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

FIG. 1 is a schematic block diagram depicting an embodiment 100 of an example computing device. In implementations, computing device 100 may be utilized, at least in part, to perform neural network processing, although subject matter is not limited in scope in this respect. In an implementation, computing device 100 may include various processor including, for example, a central processing unit (CPU) 110 and a neural network processor (NNP) 120. In an implementation, NNP 120 may include a number of neural network processing cores, such as neural network processing cores NNA 0, NNA 1, . . . , NNA m. Computing device 100 may also include an interconnect 130 and a memory controller 140, for example. In implementation, computing device 100 may also include one or more memory devices, such as memory 150, for example. Although a particular arrangement and/or configuration of computing device 100 is depicted and/or described, subject matter is not limited in scope to the particular examples discussed and/or depicted. Rather, for example, implementations may utilize any of a wide range of configurations and/or arrangements of processors, memories, interconnects, interfaces, etc.

In an implementation, CPU 110, NNP 120, interconnect 130 and/or memory controller 140 may comprise a "system-on-chip" (SOC), wherein CPU 110, NNP 120, interconnect 130 and/or memory controller 140 may be incorporated onto a particular semiconductor die and/or within a particular semiconductor package. Of course, subject matter is not limited in scope in these respects.

As mentioned, integrated circuit components, such as processors, for example, may be found in a wide range of electronic device types. Computing devices, such as computing device 100, for example, may include integrated circuit components, such as CPU 110 and/or NNP 120, for example, to process signals and/or states representative of diverse content types for a variety of purposes. As also mentioned previously, with an abundance of diverse content being accessible, signal and/or state processing techniques continue to evolve. Many electronic devices, such as computing device 100, may operate, at least in part, in accordance with some form of executable computer program code, such as software and/or firmware.

As mentioned above, software compartmentalization may be increasing throughout the computing industry, leading to further development of virtualization technologies to improve security by partitioning a single operating system (OS) and its various services, for example. This approach may sometimes be referred to as virtualization-based security (VBS).

In VBS-type systems, for example, a hypervisor may be utilized. "Hypervisor" and/or the like refers to a software component that, when executed by a processor of a computing device, generates, runs and/or manages one or more virtual machines on the computing device. In some systems, a particular purpose of a hypervisor may be to help ensure appropriate security separation of various aspects of an OS, for example. In some systems, more relatively complex functions such as scheduling various aspects of the OS and/or its services and/or scheduling software applications may remain a responsibility of the OS. That is, in such systems, the hypervisor may not be responsible for scheduling. Limiting the responsibilities of a hypervisor to security separation may allow the hypervisor to be sufficiently small and/or sufficiently simple in implementation to be formally verifiable (e.g., shown to be correct via human and/or machine analysis).

Figure 2:
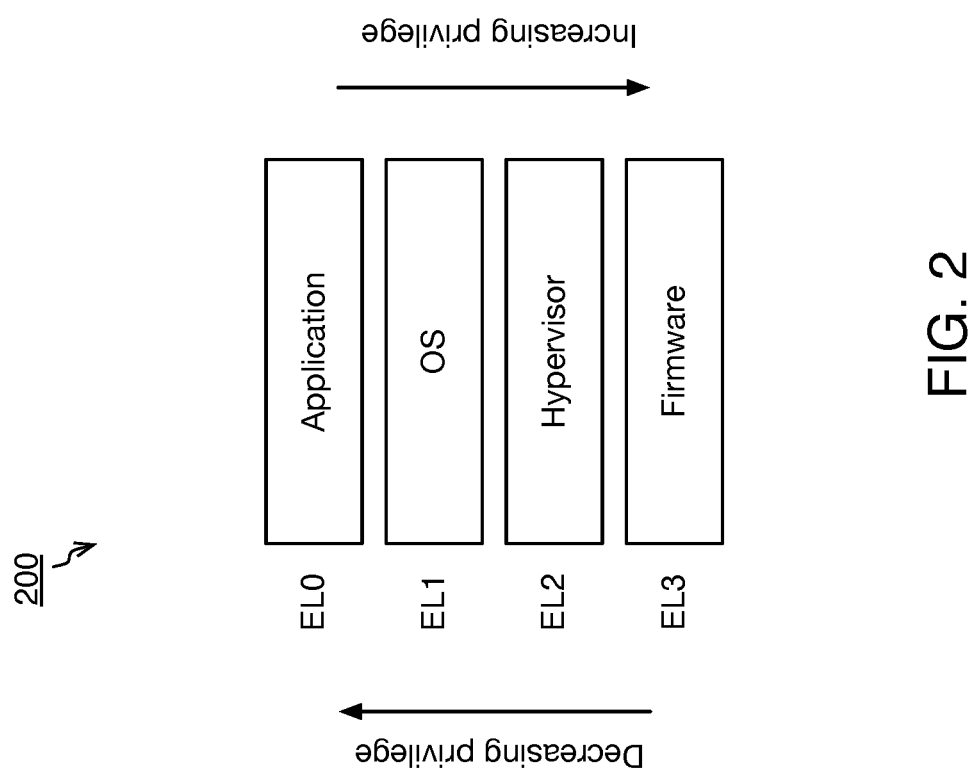
FIG. 2 is a diagram illustrating example exception levels for an example software model, in accordance with embodiments.

FIG. 2 is a diagram illustrating an example software model 200, including example exception levels. In implementations, software and/or firmware to be executed by a computing system, such as computing device 100, may be partitioned into different levels of access to various system and/or processor resources, including different hardware components. In this context, "component," "hardware component" and/or the like refer to particular circuitry within a computing device. An example of how software and/or firmware may be partitioned into different levels of access to various system and/or processor resources may include a split between an OS kernel, which may have a relatively high level of access to system resources, and user applications, which may have a more limited ability to access system resources.

To achieve various levels of access to system resources, a software model, such as software model 200, for a computing device, such as computing device 100, may implement different levels of privilege. In implementations, a current level of privilege may be changed responsive at least in part to a processor taking or returning from an exception. Privilege levels may therefore sometimes be referred to as "exception levels." In implementations, exception levels may be labeled "EL0," "EL1," "EL2," and/or "EL3," for example, depending on the particular exception level being referred to. In an implementation, the higher the number associated with an exception level, the greater the privilege. Thus, for example, a particular software model, such as example model 200, may include application code running at EL0. Also, for example, an OS may operate at EL1. Further, in an implementation, a hypervisor may run at EL2. EL3 may indicate low-level firmware and/or security code, for example. As indicated by example software model 200 depicted in FIG. 2, low-level firmware and/or security code operating at EL3 may have greater and/or more direct access to hardware components due to an increased privilege as compared with a hypervisor operating at EL2 or an OS operating at EL1, for example. Of course, software model 200 is merely an example, and subject matter is not limited in scope in these respects. For example, other software models may include fewer and/or greater number of exception levels and/or may implement different numbering schemes (e.g., increasing levels of privilege may be represented by a decrease in exception level numbering).

Figure 3:
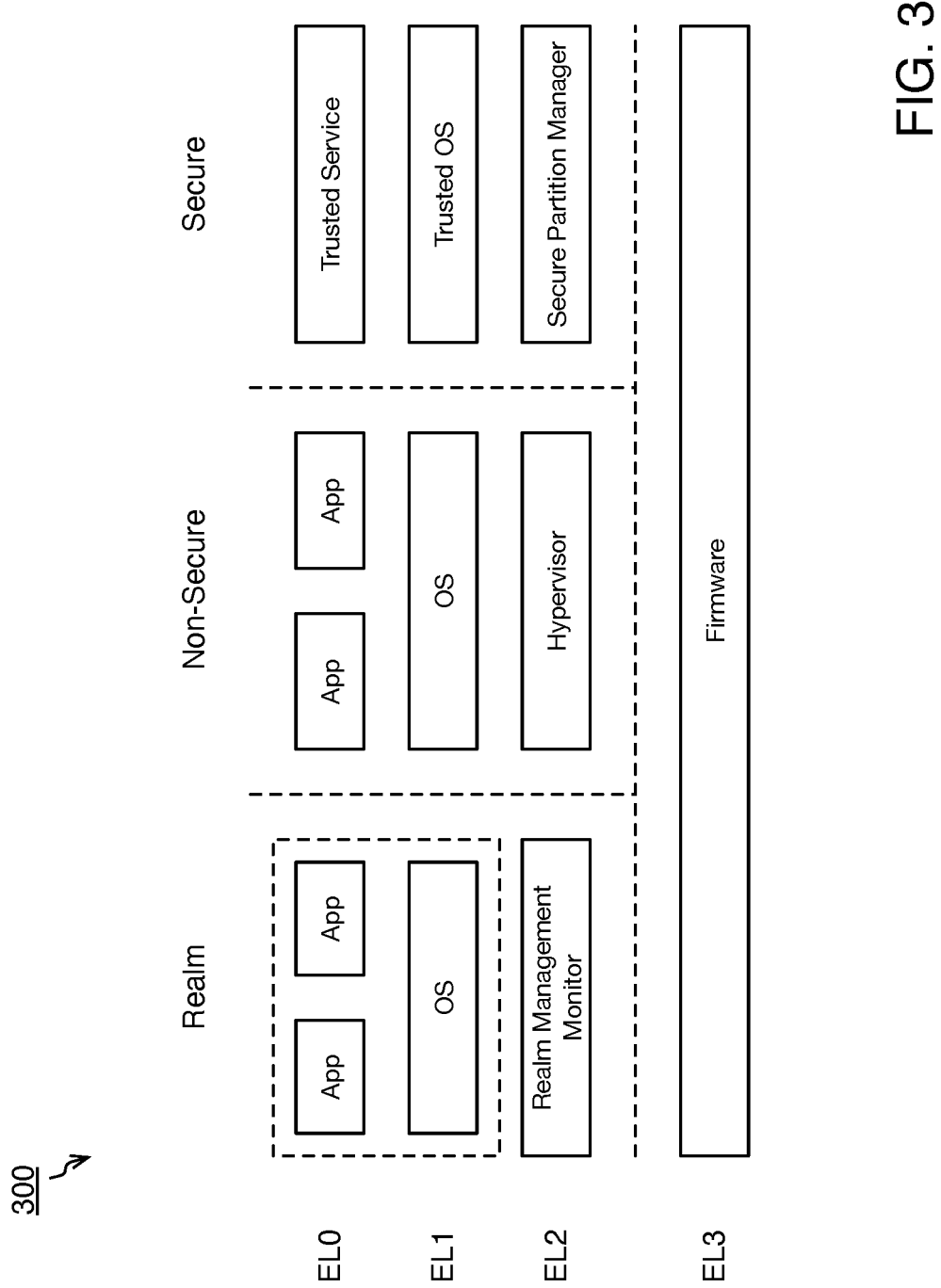
FIG. 3 is a diagram illustrating example exception levels for an example software model including secure and non-secure software components, in accordance with embodiments.

FIG. 3 is a diagram illustrating an example software model 300 including multiple security states, discussed more fully below. Example software model 300 also includes exception levels EL0-EL3, similar in at least some respects to the exception levels discussed above in connection with example software model 200.

Some processor architectures, including one or more processor architectures developed by ARM Limited, for example, may include a "TrustZone" and/or the like. In TrustZone, for example, a regular OS may operate in a "non-secure world" while particular security services may operate as part of a trusted OS in a separate "secure world." See example software model 300 depicted in FIG. 3. Note that the non-secure world representation depicted in FIG. 3 is similar in a number of respects to software model 200 depicted in FIG. 2, including, for example, EL0 applications, an EL1 OS and/or an EL2 hypervisor. Generally, "TrustZone" and/or the like refers to a hardware security extension directed at providing a secure execution environment by partitioning computer resources between a secure world and a non-secure world. It may be noted that exception levels may be implemented in each of the various security states, including secure world and non-secure world.

Over time, the amount of software running under a trusted OS has increased significantly leading to relatively more complex software implementation. Generally, relatively more complex software may be more prone to bugs due at least in part to having a relatively larger codebase, for example. VBS may mitigate this tendency to at least some extent by moving some services back to the non-secure world while being isolated using a VBS hypervisor. However, VBS may not negate the need for TrustZone and/or the like, and/or may leave software running under a single trusted OS. Some processor architectures may utilize secure partitions, wherein an equivalent of a hypervisor referred to as a secure partition manager (SPM) may operate in the secure world. See software model 300 depicted in FIG. 3, for example. In some systems, multiple trusted OSes may run under a SPM, thereby allowing different secure services to be more thoroughly compartmentalized, for example. In some systems, a SPM may be directed to the task of appropriate security separation while being small and/or simple enough in implementation to be formally verifiable, much like a VBS hypervisor, for example.

An additional security mechanism referred to as "realms" may be introduced to some processor architectures to provide additional support for confidential computing, for example. A realms architecture may introduce another security state referred to as a "realm" state to operate alongside existing non-secure and secure states. See, for example, software model 300 depicted in FIG. 3. In implementations, a realm may thought of as being similar in at least some respects to an OS and/or secure partition, for example. Also, in implementations, a realm world may include a hypervisor-like "realm management monitor" (RMM) to manage one or more (e.g., multiple) realms. As with a VBS hypervisor and/or SPM, an RMM may be directed to providing appropriate security separation while being sufficiently simple and/or sufficiently small in implementation to be verifiable. In implementations, management components VBS, SPM and/or RMM may be different in at least some aspects from some perceptions of a hypervisor. For example, whereas a hypervisor may at times be seen as complex as an OS while also duplicating similar functionality in at least some aspects, the VBS, SPM and/or RMM management components may be significantly more simple and/or more small in their implementations.

As mentioned previously, machine learning (ML), for example, is becoming increasingly prevalent throughout the computing industry. It appears to be the expectation among some in the computing industry that a great deal (e.g., all) computation tasks may eventually take on some form of ML solution. To address this surge of interest in ML, more and more systems appear to be including ML accelerators and/or the like. If ML tasks are to exist in many forms of computing and/or if computing is to become more and more compartmentalized as noted as above, then clearly there may be a need for ML accelerators and/or the like to be accessible to virtual machines, secure partitions, and realms, for example. Note that although hardware component(s) described herein and/or depicted in one or more figures may comprise an ML accelerator and/or the like, subject matter is not limited in scope in this respect.

In relatively simple computing systems (e.g., having a single OS) a software application may rarely have direct access to a particular hardware component such as an ML accelerator and/or the like. Instead, an application may utilize an application programming interface (API) to interact with a driver in the OS and the driver may configure, access, etc. the hardware component on the application's behalf. This approach allows an OS to prevent multiple applications from trying to do conflicting things with the particular hardware component. In some circumstances, such a hardware component may be capable of direct memory access and the OS may manage the particular hardware component more specifically to avoid corruption of memory either by accident and/or by malicious intent from a rogue application, for example.

In a relatively more complex system (e.g., having multiple OS, multiple virtual machines (VMs) and/or a more traditional hypervisor), another problematic aspect of hardware component management may be introduced. For example, in much the same way that an OS may not allow an application to directly access a particular hardware component to avoid multiple applications accessing the particular hardware component at the same time, a hypervisor may operate to prevent multiple VMs from trying to do conflicting things with the particular hardware component.

In some circumstances, some types of hardware components, such as a graphics processing unit (GPU), for example, may be accessed by a single VM at a time. In such a circumstance, a hypervisor may have a relatively simple task in that it may allow a single VM direct access to the GPU, for example, and may block other VMs. For example, in some circumstances there may be a particular OS drawing to a screen.

However, with ML becoming more prevalent and/or with multiple VMs concurrently accessing a particular ML accelerator component and/or the like, difficulties may arise in trying to have a hypervisor and/or the like manage an ML accelerator component and/or the like. Also, in circumstances in which software components from the secure world, non-secure world and/or realm world request use of a particular hardware component, such as an ML accelerator, difficulties may arise in trying to share the device without compromising security and/or confidentiality. Difficulties may further be realized in trying to appropriately manage such a particular hardware component under such circumstances using an SPM and/or RMM, for example. Challenges may also be faced in addressing such difficulties while keeping VBS, SPM and/or RMM implementations sufficiently simple and/or sufficiently small to be formally verifiable (e.g., without introducing complex device drivers into these software components). It may be advantageous to reduce, limit and/or minimize the amount of software that operates in privileged execution states and/or secure states (e.g., secure world and/or realm world).

In some circumstances, efforts to address some of the challenging and/or problematic aspects mentioned above may include a hypervisor to create virtual device interfaces in memory with which a VM may interact. For example, a device driver in a hypervisor may interpret a virtual configuration and/or instructions and, after validating and/or wrapping the task for security purposes, may translate the virtual configuration and/or instructions to configuration/instructions for the particular hardware component (e.g., similar in some respects to what an OS may do for an application). In some circumstances, such an approach may result in relatively higher latency and/or may utilize a relatively larger amount of software overhead. This may be acceptable for some hardware components that may be configured and/or reconfigured relatively infrequently but may be rather less acceptable for hardware components that may execute new tasks relatively frequently, for example.

In other circumstances, efforts to address some of the aspects mentioned above may include a hardware solution in which a particular hardware component may present multiple logical interfaces and in which a hypervisor may manage which VM can access which interface through use of a memory management unit (MMU), for example. Such approaches may provide a VM with a direct interface to the particular hardware component, may relatively significantly reduce latency and/or may be better suited to more relatively frequent interaction with the particular hardware component. However, even with a hardware solution providing multiple logical interfaces, a hypervisor may still need to emulate a virtual device in memory to ensure that instructions are appropriately wrapped to avoid corruption of memory (e.g., whether accidental and/or malicious) in much the same way that an OS may wrap an original application request through an API using an OS driver, for example. Thus, even with approaches utilizing multiple logical interfaces, the hypervisor may often need to emulate a virtual device in memory thereby resulting in a need for relatively larger and/or relatively more complex device drivers in the hypervisor. Further, basic hardware component management, such as power on/off and/or assignment of interfaces, may present relatively complex issues to solve for a hypervisor device driver, for example.

Still further, in some circumstances, efforts to address the problematic aspects discussed above utilize approaches centered on utilization of non-secure world software components to access particular hardware components. For example, for circumstances having two worlds, such as secure world and non-secure world, it may be possible to have a secure world software component manage a hardware component interface because the secure world software component may be trusted by non-secure world components. However, in at least some circumstances, VMs, ML accelerators, etc. may operate out of non-secure world and tasking a secure world software component to manage the particular hardware component interfaces may result a significant increase in overhead due, at least in part, to the need to transfer of data (e.g., signals and/or states) between secure world and non-secure world software components. Add the potential for multiple software components (applications, OSes, etc.) operating in multiple different/parallel security states (e.g., non-secure world, secure world and/or realm world) being provided access to particular hardware components, and the problematic and/or challenging aspects discussed above may become significantly more problematic and/or challenging.

Embodiments disclosed herein, as representative, non-limiting examples, may be directed to addressing, in whole or in part, the example issues, problems and/or challenges discussed above. For example, implementations may include providing access to particular hardware components for multiple software components operating in multiple respective different security states (e.g., secure world, non-secure world and/or realm world) wherein the different security states may have conflicting aspects. As discussed more fully below, example implementations may be advantageously utilized in the context of various software model partitioning approaches, such as the example partitioning approaches mentioned above including multiple exception levels (and/or levels of privilege) and/or also including various and potentially conflicting security states (e.g., secure world, non-secure world and/or realm world).

Also, embodiments disclosed herein may be advantageously utilized for management of a wide range of hardware component types. Implementations may include access to particular hardware components via logical interfaces (e.g., implemented in hardware on the particular hardware components) to be assigned to and/or utilized by OSes, VMs, secure partitions, realms, etc. without a need for multiple and/or complex device drivers for the various hypervisors, SPM and/or RMM, for example.

As discussed more fully below, implementations may provide one or more task control interfaces (TCI) implemented in hardware at particular hardware components. In implementations, TCIs may be allocated to software components operating in any of the various security states including, for example, non-secure, secure and/or realm security states. As further discussed below, the assignment, configuration, management and/or lifecycle of TCIs for one or more hardware components may be may be managed by a particular hardware-based interface referred to as a primary management interface (PMI) (e.g., also implemented in hardware as part of particular hardware components). Of course, subject matter is not limited in scope to the particular example embodiments and/or implementations discussed herein.

Figure 4:
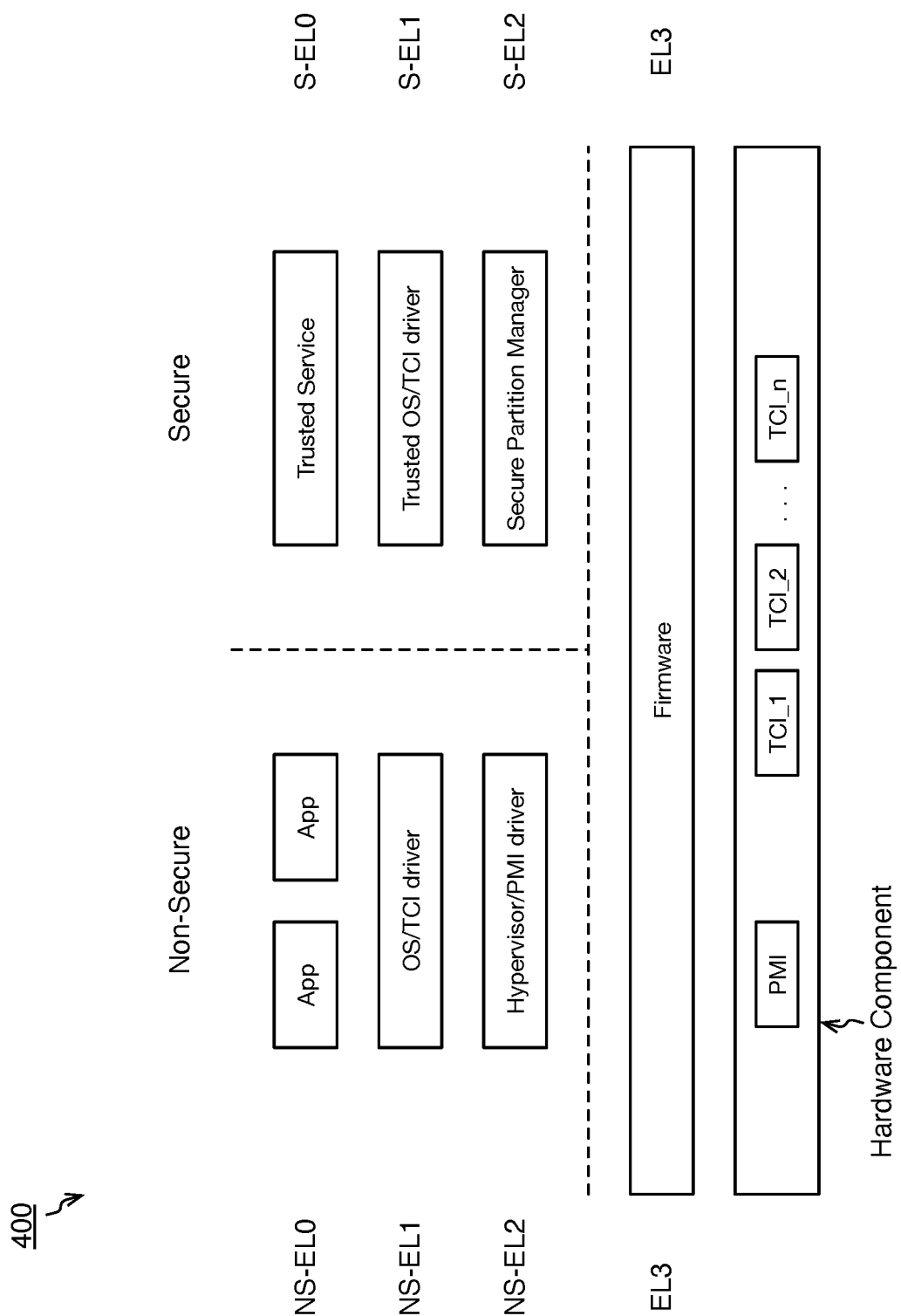
FIG. 4 is a diagram illustrating an example software model for an example computing device including a primary management interface driver for a hardware-based primary management interface and/or a task control interface driver for one or more hardware-based task control interfaces, in accordance with embodiments.

FIG. 4 is a diagram illustrating an example software model 400 for an example computing device, such as computing device 100, including a PMI driver (e.g., implemented in software) to configure and/or access a hardware-based PMI located at a particular hardware component and further including a TCI driver (e.g., implemented in software) to configure and/or access one or more hardware-based TCIs for the particular hardware component. In an implementation, example software model 400 may include a number of characteristics similar at least in part to example models 200 and 300, discussed above. For example model 400, "realm" world aspects have not been depicted for clarity of explanation. It should be noted, however, that example embodiments may include multiple distinct security states including, by way of non-limiting examples, secure world, non-secure world and/or realm world. As depicted in FIG. 4, for this particular non-limiting example, various exception levels may exist for non-secure world and/or for secure-world. Non-secure world exception level 0 may be designated as "NS-EL0" while secure-world exception level 0 may be labelled "S-EL0" and/or realm-world exception level 0 may be labelled "R-EL0," for example. Similarly, for example, non-secure EL1 may be labelled "NS-EL1," secure EL1 may be labelled "S-EL1" and/or realm EL1 may be labelled "R-EL1." Further, non-secure EL2 may be labelled "NS-EL2," secure EL2 may be labelled "S-EL2" and/or realm EL2 may be labelled "R-EL2." Again, these exception levels and/or security states are merely examples, and subject matter is not limited in scope in these respects.

It may be noted that FIG. 4 depicts a hardware component comprising multiple hardware-based TCIs. In an implementation, a particular hardware component may comprise an NNP, GPU, etc., although subject matter is not limited in scope in this respect. Also, in implementations, the various TCIs may comprise hardware-based interfaces by which one or more software components may interact with the particular hardware component. In an implementation, a TCI driver may comprise a software component that may operate at NS-EL1 and/or S-EL1 as part of a non-secure world OS and/or a secure-world trusted OS, for example. Further, in an implementation, a PMI driver may comprise a software component operating at NS-EL2. In an implementation, a PMI driver may comprise a portion of and/or may interact with a hypervisor at NS-EL2, for example.

As explained more fully below in connection with FIG. 5 and FIG. 6, and also referring to FIG. 4, embodiments may include maintaining management of hardware component interfaces from non-secure world. For example, a non-secure world software component, such as a PMI driver (e.g., NS-EL2), may, via a hardware-based PMI, set up one or more interfaces (e.g., TCIs) at a particular hardware component for non-secure world, secure world and/or realm world software components, in an implementation.

Generally, for example, a first level software component, whether secure world, non-secure world and/or realm world (e.g., S-EL1, NS-EL1 and/or R-EL1), may request access to a particular hardware component. A second level (e.g., S-EL2, NS-EL2 and/or R-EL2) software component may receive the request from the first level software component and may provide a non-secure world second level (e.g., NS-EL2) software component, such as a PMI, specifications on how to configure a particular hardware component. For example, a S-EL1 software component may make such as request to a S-EL2 software component, a NS-EL1 software component may make a request to a NS-EL2 software component and//or a R-EL1 software component may make a request to a R-EL2 software component. In an implementation, responsive at least in part to a second-level software component receiving a request from a first-level software component, a non-secure, second level PMI driver (e.g., NS-EL2) may, via a hardware-based PMI for a particular hardware component, configure a particular hardware-based TCI of one or more TCIs for the particular hardware component, may set up a memory management unit (MMU) mapping and/or may configure an interrupt controller for the particular hardware component, for example. Of course, these are merely examples of how a PMI and/or PMI driver may assign, configure and/or manage a particular hardware component via one or more hardware-based TCIs. Once the PMI and/or PMI driver has configured a particular TCI for the particular hardware component, the second level software component (e.g., NS-EL2, S-EL2 and/or R-EL2 depending at least in part on a security state of the requesting first level software component) may check to ensure that the PMI/PMI driver correctly configured the particular TCI. Responsive to the configuration being validated, the second level software component (e.g., NS-EL2, S-EL2 and/or R-EL2 depending at least in part on a security state of the requesting first level software component) may mark the particular TCI as active (e.g., may transition the particular TCI to an "active" state, as discussed more fully below) and the requesting first level software component may be allowed to access the particular TCI. For example, the first level software component may schedule jobs directed to the particular hardware interface, and may continue to do so as long as the particular TCI remains in an active state, as explained more fully below.

Figure 5:
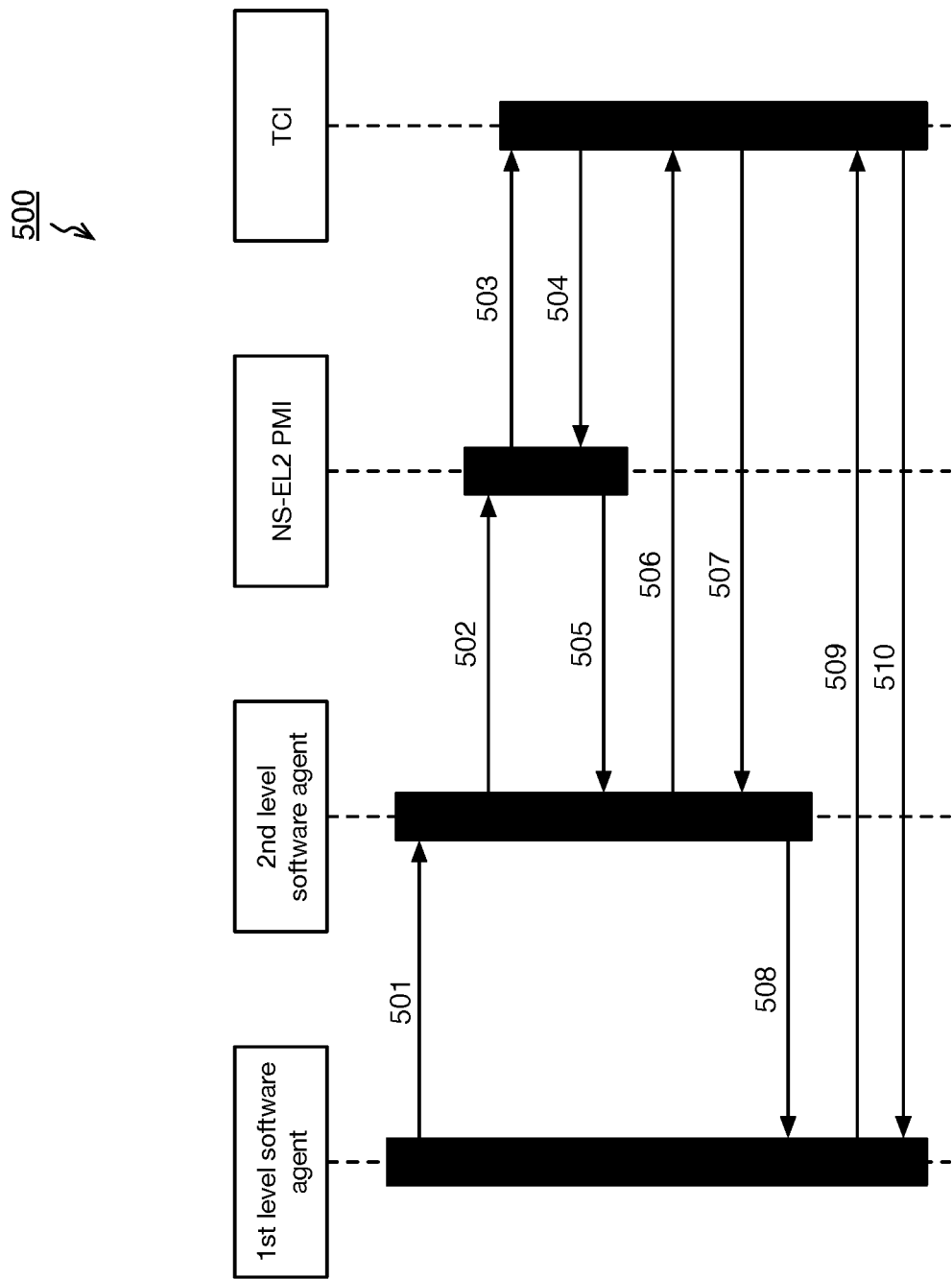
FIG. 5 depicts an example message flow diagram for an example process for assigning, configuring and/or managing a particular hardware component, in accordance with embodiments.

FIG. 5 depicts an example message flow diagram 500 for an example process for assigning, configuring and/or managing a particular hardware device. FIG. 5 may be studied in conjunction with FIG. 4 for increased understanding. Embodiments in accordance with claimed subject matter may include all of messages 501-510, fewer than messages 501-510, and/or more than messages 501-510. Likewise, it should be noted that content acquired or produced, such as, for example, input signals, output signals, operations, results, etc. associated with example message flow diagram 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, messages 501-510 may be communicated as one or more signals and/or signal packets among various software, firmware and/or hardware services executed at computing device 100, for example.

As indicated by arrow 501 of message flow diagram 500, a software component (e.g., TCI driver) operating at a first level (e.g., NS-EL1, S-EL1, R-EL1, etc.), such as one or more aspects of one or more OS, VM, etc., may request access to an interface (e.g., hardware-based TCI) for a particular hardware component. In an implementation, the first level software component (e.g., TCI driver) may operate in any of a plurality of security states, such as non-secure world, secure world and/or realm world, although subject matter is not limited in scope in this respect. For example message flow 500, the first level software component may operate in non-secure world. Further, in an implementation, a software component operating at a second level (e.g., NS-EL2, S-EL2, R-EL2, etc., depending at least in part on the particular security state of the requesting first level software component) may validate the request made by the first level software component and/or may forward the request to a non-secure PMI device driver (NS-EL2 PMI) as indicated by arrow 502, for example.

In various implementations, it may be advantageous to reduce cross-communication between non-secure, secure and/or realm worlds, for example. Thus, in implementations, a validating second-level software component responding to a request from a first level software component may belong to the same security state as the first level software component. Thus, for circumstances in which the requesting first level software component operates in non-secure world (e.g., NS-EL1), the validating second level software component may also operate in non-secure world (e.g., NS-EL2). Similarly, for circumstances in which the requesting first level software component operates in secure world (e.g., S-EL1), the validating second level software component may also operate in secure world (e.g., S-EL2) and for circumstances in which the requesting first level software component operates in realm world (e.g., R-EL1), the validating second level software component may also operate in realm world (e.g., R-EL2), for example.

As mentioned, a second level software component tasked with validating a request received from a first level software component (e.g., TCI driver) may, upon validation of the request, forward the request to a PMI driver. In implementation, the PMI driver may operate at a second level in non-secure world (e.g., NS-EL2). Thus, for example, for circumstances in which the requesting first level software component operates in non-secure world, an example request flow may include communications from NS-EL1 (e.g., requesting software component) to NS-EL2 (e.g., validating software component) and then to the PMI driver at NS-EL2. In this example, there is no cross-over between non-secure world and secure world. Also, for example, for circumstances in which the requesting first level software component operates in secure world, an example request flow may include communications from S-EL1 (e.g., requesting software component) to S-EL2 (e.g., validating software component) and then to the PMI driver at NS-EL2. For this particular example, there may be a single cross-over between secure-world and non-secure world. Similarly, for circumstances in which the requesting first level software component operates in realm world, a request flow may include communications from R-EL1 (e.g., requesting software component) to R-EL2 (e.g., validating software component) and then to the PMI driver at NS-EL2. Again, there may exist a single cross-over between different security states (e.g., between realm world and non-secure world). Although examples described herein mention a PMI driver operating in non-secure world (e.g., NS-EL2), other implementations may place the PMI driver in other security states, such as, for example, realm world. In implementations, a PMI driver may be implemented to operate in whichever security state is more likely to reduce cross-communication between different security states, for example.

In an implementation, the PMI driver may perform different operations including, for example, setting up an MMU mapping and/or configuring an interrupt controller, for example, for a particular interface, such as a particular TCI, for a particular hardware component. For example message flow diagram 500, arrows 503 and/or 504 are meant to illustrate communication between the PMI driver, operating via a hardware-based PMI located at the particular hardware component, and the hardware-based TCI for the particular hardware component to assign, schedule and/or configure the particular TCI.

Additionally, as indicated by arrows 506 and/or 507, the validating second level software component (e.g., NS-EL2, S-EL2, R-EL2, etc., depending at least in part on the particular security state of the requesting first level software component) may check the TCI configuration to ensure the PMI performed the configuration correctly and that no other processes have corrupted the specified configuration. At least in part in response to the configuration of the TCI being validated, the TCI may be transitioned to an active state. For example, responsive at least in part to the configuration of the TCI as being validated, the PMI driver may communicate with the TCI driver to prompt the TCI driver to transition the TCI to an active state, as discussed more fully below.

Further, in an implementation, responsive at least in part to the TCI transitioning to the active state, the first level software component (e.g., TCI driver) may be granted permission to access the particular TCI, as indicated by arrow 508. Also, for example message flow diagram 500, arrows 509 and 510 are meant to depict the first level software component (e.g., TCI driver) accessing the particular TCI. For example, once the validating second level software component has ensured that the PMI has correctly configured the particular TCI for the particular hardware component, the first level software component (e.g., TCI driver) may be free to schedule jobs with the particular TCI as long as the particular TCI remains in an active state, in an implementation.

For a particular circumstance wherein a requesting first level software component (e.g., TCI driver) operates in S-EL1, example message flow diagram 500 may be restated more briefly as follows. In an implementation, for this particular example circumstance, a PMI driver (e.g., NS-EL2) may set the configuration of a particular TCI (e.g., of one or more hardware-based TCIs) of a particular hardware component based on instructions received from a software component operating in S-EL2. The S-EL2 software component may check the configuration, and once satisfied with the configuration may grant permission to the S-EL1 software component to access the particular hardware component via the particular TCI. Once having received such permission, the S-EL1 software component may continue to schedule jobs for the particular TCI without having to perform additional configurations, checks, etc. Also, the S-EL1 software component doesn't need to check with or work through the NS-EL2 software component (e.g., PMI driver). This may result in a relatively low-overhead implementation (e.g., via reduced cross-communication between security states) while still satisfying security and/or confidentiality requirements.

In implementations, when a PMI driver, for example, initiates configuration of a particular hardware-based TCI, the TCI's state may be automatically cleared and/or the TCI may be reverted to a clean state. For example, in some implementations, hardware must perform such clearing and/or reverting automatically. For example, in an implementation, a PMI driver may initiate TCI configuration via a hardware-based PMI for a particular hardware component, and the hardware-based PMI for the particular hardware component may (e.g., must) provide a clean slate TCI. As part of such a configuration, the PMI (e.g., PMI driver operating via hardware-based PMI) may configure a particular memory protection attribute that the TCI may utilize to access memory. In some implementations, the PMI must configure the particular memory protection attribute that the TCI must utilize to access memory. In implementations, memory accesses from a particular hardware component may be related via a particular memory access attribute to a specific TCI. For example, in some implementations, every memory access from a particular hardware component must be related via a particular memory access attribute to a specific TCI. In an implementation, the particular memory protection attribute may be referred to as a "contextID". This ID may be used by a MMU for address translation and/or memory protection, for example. A contextID may be reserved at device initialization, for example. Also, in an implementation, when a PMI moves a TCI from a configuration state to an enabled state, the contextID may be checked for uniqueness with respect to other enabled TCIs, without which this will error and the TCI will remain in the configuration state.

In implementations, TCIs may have a fixed association to a particular contextID while allocated. For example, in some implementations, TCIs must have a fixed association to a particular contextID while allocated. This may allow a PMI (e.g., PMI driver operating via a hardware-based PMI) to over-provision TCIs at least in part by configuring a TCI with one contextID before revoking and reconfiguring the same TCI with a different contextID. In such a scenario, a TCI driver may still be informed when a particular TCI is revoked by the PMI driver, for example. This may allow MMU page-tables to persist between uses of a TCI, in an implementation.

In implementations, as discussed above, a PMI (e.g., PMI driver operating via a hardware-based PMI for a particular hardware component) may be responsible for controlling access to and configuring TCIs. As mentioned, a particular hardware component may comprise multiple hardware-based TCIs. The PMI may manage allocation and/or assignment of TCIs to TCI drivers. for example.

Further, in implementations, TCIs may maintain a mutually untrusting relationship with each other and/or with the PMI. When the PMI initiates configuration of a TCI, the TCI's state may be automatically cleared and/or may be reverted to a clean state, as mentioned. Once a TCI has been marked as configured by the PMI, its PMI-controlled configuration cannot be changed without revoking and/or reinitializing the TCI, in an implementation. Upon receipt of a message indicating a configured TCI, the TCI driver may mark the TCI as delivered causing it to transition to its active state. In an implementation, this may be done before the TCI can be used to perform work. If the TCI is revoked and/or reinitialized, the delivered marker may be automatically cleared (e.g., TCI transitions out of its active state), making it apparent to the TCI owner if the PMI tampers with the TCI configuration, for example. In some implementations, such as if a particular TCI is allocated to a secure-world software component, then only a secure-world component can set the active marker. That is, for example, if a particular TCI is allocated to a secure-world software component, a non-secure software component cannot set the marker, in an implementation. Similarly, if a particular TCI is allocated to a realm-world software component a non-secure software component cannot set the active marker, in an implementation. Rather, for example, if a particular TCI is allocated to a realm-world software component, then only a realm-world software component can set the active marker. These example characteristics may help ensure the security model of a non-secure PMI driver being responsible for allocating TCIs to secure and/or realm software components, for example.

In implementations, a PMI may comprise a memory-mapped input/output (MMIO) interface. In implementations, TCIs may also comprise MMIO interfaces. In implementations, a TCI may be assignable to secure, non-secure and/or realm-world address spaces, for example. Further, in an implementation, a PMI may be assignable to a non-secure address space. It may be noted that for implementations in which a particular TCI is assigned to a secure-world address space, for example, the particular TCI MMIO cannot be accessed by software executing in non-secure world. Similarly, if the TCI is assigned to a realm-world address space, non-secure software components cannot access it, for example.

In implementations, while TCIs may be owned by a software component from a specific security state, operation of a specific behavior may involve interactions between multiple software components across multiple security states, for example. In implementations, software stacks in differing security states may be considered mutually untrusting, despite needing to interact in a cooperative fashion. An example of this behavior may include the non-secure state configuring settings using a non-secure interface for an interface assigned to the secure address space. In implementations, although the secure software component may not modify the configured settings, it may introspect the settings and/or may set a lock in the secure interface to prevent configuration modifications from the non-secure management interface, for example.

Further, an aspect of embodiments described herein may be to serve different virtual machines, operating systems, secure partitions, and/or other types of software existing at a first exception level (e.g., NS-EL1, S-EL1, R-EL1, etc.) across any of the security states, with software in NS-EL2 acting as a device manager to these first level stacks, for example. The aspect mentioned above regarding mutually untrusting security states is described missing an important exception that the NS-EL2 software component be able to trust second level software from other security states, but this trust may be unidirectional as these other second level stacks need not trust NS-EL2. For example, to avoid conflicts and/or race-conditions, the NS-EL2 software component may rely on the other second level stacks not interacting with the MMIO management interface, the PMI. Additionally, individual first exception level software stacks may be able to trust the corresponding second exception level software stack from the same security state. In implementations, the second level stack may well interact with an MMIO interface intended for the first level stack, such as in the case of the TCI to validate its configuration, for example. In circumstances, this may only be prior to the second level stack providing a MMU mapping for the first level stack to reach the interface, for example. In implementations, software components at a second exception level may not trust any first exception level software, whether from the same security state or not.

In implementations, despite TCIs being described as being owned by a specific exception level in a specific security state, there may be software components across the security states at the specified exception level working in concert to implement the various behaviors and/or operations. For example, the software component from the owning security state may be the only component to interact with a specified MMIO interface. However, the corresponding software components in other security states may play several roles such as in validating the behavior of corresponding components, communication between software components across differing interfaces and/or marshalling access to the device interfaces, for example.

Figure 6:
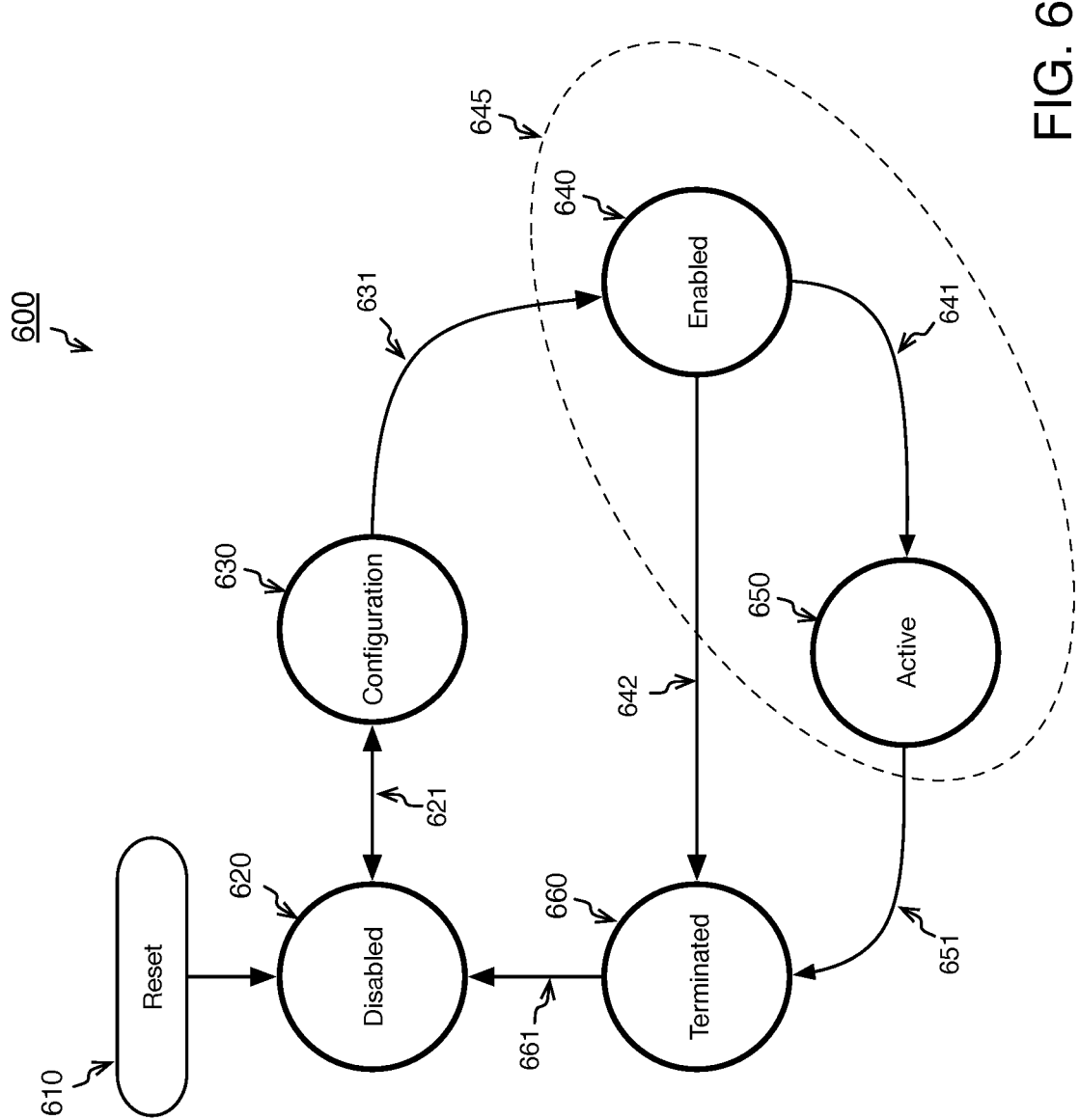
FIG. 6 is an illustration depicting an example state diagram for a particular hardware component, in accordance with embodiments.

FIG. 6 is an illustration depicting an example state diagram 600 for a particular TCI for a particular hardware component. In an implementation, state diagram 600 may represent various operational states of a particular TCI of a particular hardware component (e.g., NNP, GPU, etc.). As depicted in diagram 600, a reset stimulus 610 (e.g., hardware reset, power-on, etc.) may cause the TCI to enter a disabled state 620. In an implementation, a TCI may enter a configuration state 630 responsive at least in part to a PMI (e.g., PMI driver operating via a hardware-based PMI for the particular hardware component) assigning the TCI to a particular second level (e.g., NS-EL2, S-EL2, R-EL2, etc.) software component, as indicated at least in part by arrow 621. Arrow 621 also illustrates that the TCI may return to disabled state 620 responsive at least in part to the PMI revoking the assignment of the TCI to the particular second level software component. As mentioned, a TCI may be assigned to a second level software component operating in any of a plurality of security states (e.g., secure world, non-secure world and/or realm world). For the present example, the TCI may be assigned to a second level secure world software component (e.g., S-EL2).

As also depicted in state diagram 600, a TCI may transition from configuration state 630 to an enabled state 640 responsive at least in part to a completion of the PMI's configuration operations, as indicated by arrow 631, for example. In implementations, to transition from enabled state 640 to active state 650, a second level software component may validate that the PMI correctly configured the TCI. In an implementation, this second level software component may operate in the same security state as the software component to which the TCI is to be assigned. Therefore, for the current example, because the TCI is to be assigned to a secure world second level software component, only a second level secure world software component may verify the TCI's configuration and/or may transition the TCI to active state 650. It may be noted that with a TCI assigned to a secure-world physical address space, for example, only secure-world software components can set the active marker (e.g., cause a transition of the TCI to the active state). For example, an S-EL2 software agent may set the active marker as part of a validation process. This may be notable due at least in part to the fact that secure-world software components may not trust software components operating in non-secure world and/or realm world and neither non-secure world nor realm-world software components can set the active marker because the TCI is in the secure physical address space, for example. Similarly, in another example, if the TCI is assigned to a realm-world physical address space, only a R-EL2 software component can set the active marker and neither the non-secure world nor the secure-world software agents can touch the active marker.

In implementations, a transition of a TCI from enabled state 640 to active state 650 may be managed by a TCI software driver, as indicated by dotted shape 645 of FIG. 6. In implementations, the TCI driver may communicate and/or cooperate with a validating second level software component and/or other software components, as mentioned above. Other transitions of example state diagram 600 may be managed by a PMI driver (e.g., operating in conjunction with a hardware-based PMI for the particular hardware component). In may be noted that the transition of the TCI to the active state is the only state transition not managed by the non-trusted PMI driver, in implementations. For example, as mentioned, in a particular implementation a PMI driver may operate in NS-EL2 and as such may not be trusted by secure-world and/or realm-world software components. On the other hand, the TCI driver may operate in the same security state as a requesting software component and/or the same security state to which the TCI is assigned and may therefore be trusted. Thus, in implementations, the PMI driver may manage various state transitions for a TCI but may not be allowed to manage transitions to active state 650, for example.

While in the active state, the TCI may receive work in accordance with the previous configuration. In implementations, the second level software component may grant permission for a first level software component to access the TCI to schedule work for the particular hardware component, for example. In implementations, the first level software component may continue to schedule work for the particular TCI without having to check any configurations and/or without having to check with a second level software component, for example. In an implementation, permissions may be managed via an MMU. In implementations, the first level software component may only become aware of a problem if a failure is reported by the TCI (e.g., TCI is no longer in active state).

As discussed previously, assignment, scheduling and/or management of the various TCIs for a particular hardware component may be performed by a PMI driver. Therefore, the PMI driver may cause the TCI to exit enabled state 640 and/or to exit active state 650 to enter a terminated state 660 by way of revocation, as indicated by arrows 642 and/or 651, for example. Additionally, in implementations, a TCI may transition from terminated state 660 to disabled state 620 responsive at least in part to outstanding jobs being completed, terminated and/or cancelled and/or responsive at least in part to one or more job slots being revoked, as indicated by arrow 661. While in the disabled state 620, the particular TCI may be made available for further assignment, for example.

Figure 7:
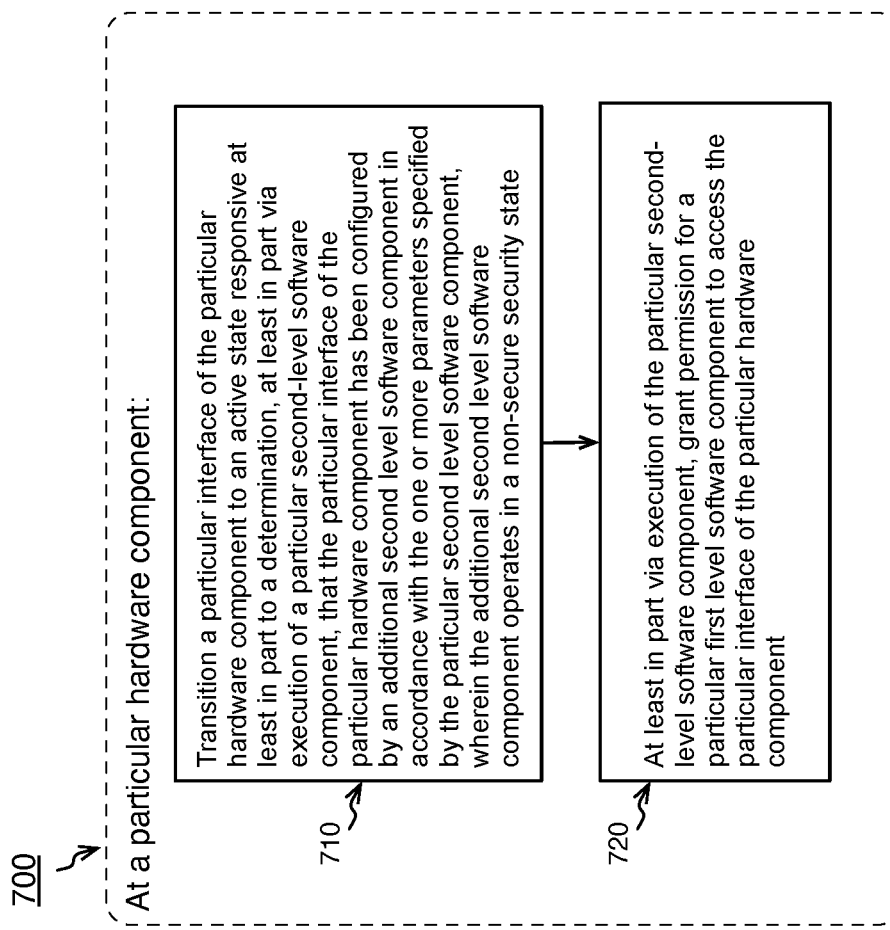
FIG. 7 is a flow diagram illustrating an example process for assigning, configuring and/or managing a particular hardware component, in accordance with embodiments.

FIG. 7 is a flow diagram illustrating an embodiment 700 of an example process for assigning, configuring and/or managing a particular hardware component. Embodiments in accordance with claimed subject matter may include all of blocks 710-720, fewer than blocks 710-720, and/or more than blocks 710-720. Likewise, it should be noted that content acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, blocks 710-720 may be communicated as one or more signals and/or signal packets among various software, firmware and/or hardware services executed at computing device 100, for example.

As depicted in FIG. 7, example process 700 may pertain to a particular hardware component of a computing device, such as computing device 100. In implementations, the particular hardware component may comprise a NNP and/or a GPU, for example, although subject matter is not limited in scope in these respects. As depicted at block 710, a particular interface (e.g., hardware-based TCI) of the particular hardware component may be transitioned to an active state responsive at least in part to a determination, at least in part via execution of a particular second level software component, that the particular interface of the particular hardware component has been configured by an additional second level software component (e.g., PMI) in accordance with the one or more parameters specified by the particular second level software component. In an implementation, the additional second level software component may operate in a non-secure security state (e.g., NS-EL2). Further, as depicted at block 720, at least in part via execution of the particular second level software component, a particular first level software component may be granted permission to access the particular interface of the particular hardware component.

In implementation, example process 700 may further comprise the particular first level software component scheduling jobs directed to the particular interface of the particular component device repeatedly at least in part in response to the particular interface of the particular hardware component remaining in the active state. Example process 700 may also include transitioning the particular interface of the particular hardware component from the active state to a terminated state or a disabled state responsive at least in part to one or more outstanding jobs being completed, terminated or cancelled and/or responsive at least in part to a revocation of one or more job slots, for example. In an implementations, the particular second level software component may operate in the non-secure security state, a secure security state or a realm security state and the particular first-level software component may operate in a same security state as the particular second level software component. In implementations, transitioning the particular interface of the particular hardware component from the active state to a terminated state or a disabled state may comprise transitioning the particular interface of the particular hardware component from the active state to the terminated state or the disabled state at least in part via execution of the additional second level software component operating in the non-secure security state.

Additionally, for example process 700, the particular hardware device component may comprise machine learning accelerator circuitry located on the processor or located on a particular semiconductor die along with the processor, for example. Further, for example, the additional second level software component operating in the non-secure security state may comprise a primary management interface. In an implementation, the particular second level software component may comprise a virtualization-based security hypervisor operating in the non-secure security state, a secure partition manager operating in the secure security state or a realm management monitor operating in the realm security state, for example. Also, the particular first level software component may comprise an operating system or a virtual machine operating in the non-secure security state, a secure partition operating in the secure security state or a software component operating in the realm security state, in an implementation. Additionally, for example, the particular interface of the particular hardware component may comprise a task control interface. In an implementation, the task control interface may comprise a memory-mapped input/output interface.

In an implementation, the particular interface of the particular hardware component may comprise a particular task control interface of a plurality of task control interfaces, wherein the plurality of task control interfaces are directed to, under control of the additional second level software component operating in the non-secure security state, managing access to the particular hardware component for a plurality of first level software components operating in a respective plurality of particular security states. Further, the respective plurality of particular security states may include the non-secure security state, the secure security state and/or the realm security state, for example.

The following example comprises an ordered list of actions to be taken by various software components in the service of allocating a particular TCI. In this example, an objective is to allocate a particular TCI to the secure world. Of course, as mentioned, TCIs may be allocated to secure world, non-secure world and/or realm world, for example, although, in implementations, a particular TCI may only be allocated to one particular security state at a given time. Also, for the example presented below, "S" denotes a secure world software component. Therefore, for example, "S-EL1" denotes a first level secure world software component and "EL1" indicates a first level non-secure world software component. Similarly, "S-EL2" denotes a second level secure world software component and "EL2" indicates a second level non-secure world software component, for example. Of course, as mentioned, implementations are possible utilizing other security states such as a realm security state, for example, and subject matter is not limited in scope to the particular security states mentioned herein.

For the present example, to allocate a TCI to secure world:
S-EL1 TCI driver stack requests a hardware-based TCI to be assigned
S-EL1 sends "TCI allocation request" message
S-EL2 PMI driver stack validates request and forwards to NS-EL2 PMI driver stack
S-EL2 stack ensures no left-over MMU mappings for the S-EL1 stack to access a TCI
In implementations, this may be taken care of by S-EL2 at TCI deal location/revocation
NS-EL2 PMI driver picks a free TCI to allocate
NS-EL2 PMI driver configures TCI settings in hardware-based PMI
Settings configured according to TCI request and own policy decisions
NS-EL2 PMI driver assigns TCI to Secure physical address space (PAS) and marks TCI as configured/enabled
TCI transitions from read-as-zero/write-ignore in all PASs to read-write in Secure PAS
Any modifications to the TCI settings are no longer possible
NS-EL2 PMI driver signals to S-EL2 PMI driver that the TCI is configured as requested
NS-EL2 sends "TCI allocated" message
S-EL2 PMI driver marks the TCI as active
This marker is set through a transaction to the TCI interface in the Secure PAS
Any revocation of the TCI by NS-EL2 PMI driver would involuntarily clear this marker
S-EL2 PMI driver inspects and validates the TCI settings through the TCI interface
This is explicitly after setting the active marker but before mapping the TCI to S-EL1
If not configured as required, S-EL2 must not create the MMU map for S-EL1
S-EL2 PMI driver creates MMU mappings to allow S-EL1 TCI driver to access TCI interface
At the same time, S-EL2 should remove its own MMU mappings to the TCI interface
S-EL2 PMI driver configures general interrupt controller (GIC) mappings for TCI interrupt to route to S-EL1
S-EL2 PMI driver forwards allocated message to S-EL1 TCI driver
S-EL1 TCI driver is now able to submit jobs for dispatch
The S-EL1 stack trusts that S-EL2 has vetted that the TCI is configured correctly
Job dispatch will error if TCI active marker not previously set In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact.

Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.)

refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 8:
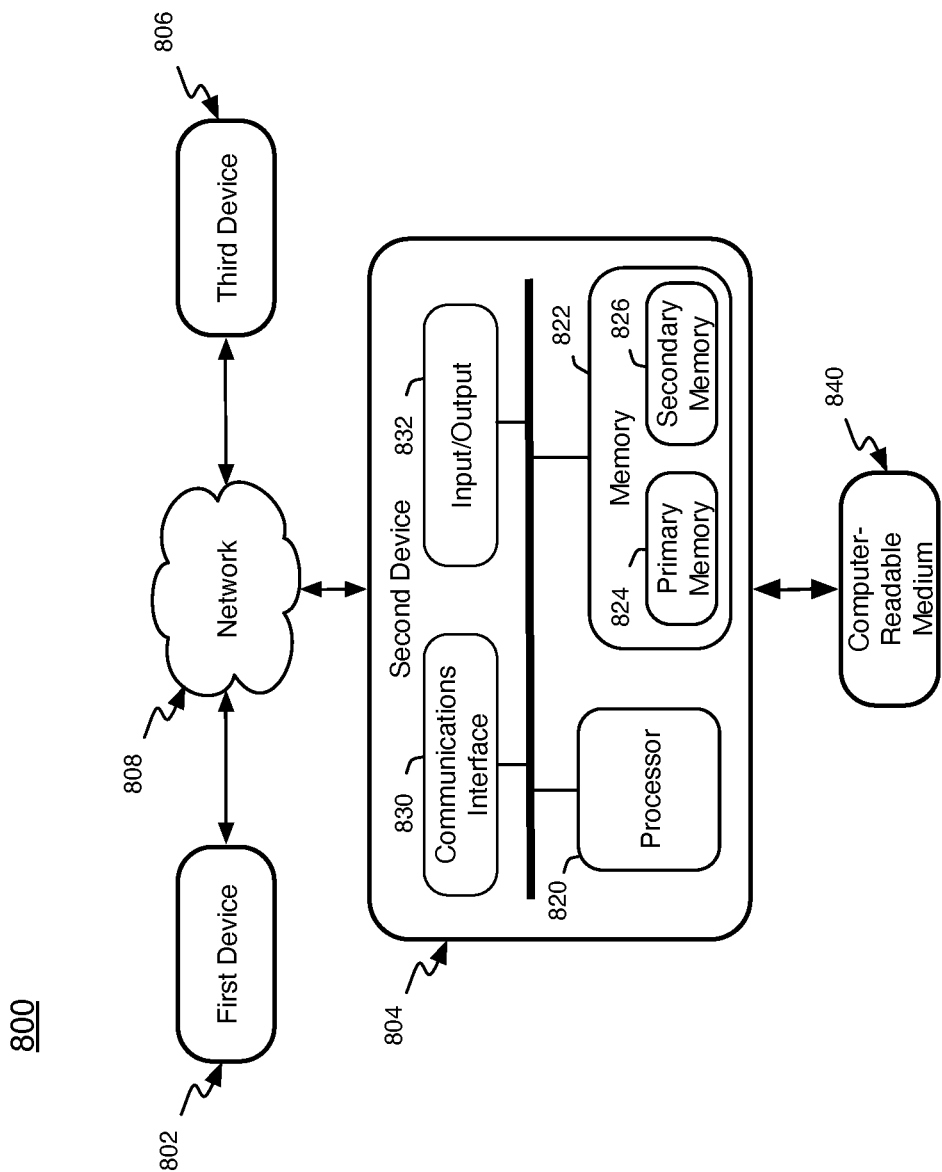
FIG. 8 is a schematic diagram illustrating an implementation of an example computing environment associated with processes to facilitate assigning, configuring and/or managing a particular hardware component, according to an embodiment.

FIG. 8 is a schematic diagram illustrating an implementation of an example computing environment associated with processes to facilitate assigning, configuring and/or managing a particular hardware device, according to an embodiment. In the example depicted in FIG. 8, a system embodiment may comprise a local network (e.g., device 804 and medium 840) and/or another type of network, such as a computing and/or communications network. For purposes of illustration, therefore, FIG. 8 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 8 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-7 and in the text associated with the foregoing figure(s) of the present patent application.

Referring now to FIG. 8, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 8, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 8, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 8, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 8 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 8, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 8 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:

transitioning a particular interface of a particular hardware component to an active state responsive at least in part to a determination, at least in part via execution of a particular second level software component, that the particular interface of the particular hardware component has been configured by an additional second level software component in accordance with one or more parameters specified by the particular second level software component, wherein the additional second level software component operates in a non-secure security state;

at least in part via execution of the particular second level software component, granting permission for a particular first level software component to access the particular interface of the particular hardware component; and transitioning the particular interface of the particular hardware component from the active state to a terminated state or a disabled state responsive at least in part to one or more outstanding jobs being completed, terminated or cancelled and/or responsive at least in part to a revocation of one or more job slots;

wherein the particular second level software component operates in the non-secure security state, a secure security state or a realm security state, wherein the particular first level software component operates in a same security state as the particular second level software component and wherein the transitioning the particular interface of the particular hardware component from the active state to a terminated state or a disabled state comprises transitioning the particular interface of the particular hardware component from the active state to the terminated state or the disabled state at least in part via execution of the additional second level software component operating in the non-secure security state.

2. The method of claim 1, further comprising the particular first level software component scheduling jobs directed to the particular interface of the particular hardware component repeatedly at least in part in response to the particular interface of the particular hardware component remaining in the active state.

3. The method of claim 1, wherein the particular hardware component comprises machine learning accelerator circuitry located on a processor or located on a particular semiconductor die along with the processor.

4. The method of claim 1, wherein the additional second level software component operating in the non-secure security state comprises a primary management interface driver, wherein the primary management interface driver to interact with a hardware-based primary management interface located on the particular hardware component.

5. The method of claim 4, wherein the particular second level software component comprises a virtualization-based security hypervisor operating in the non-secure security state, a secure partition manager operating in a secure security state or a realm management monitor operating in a realm security state.

6. The method of claim 5, wherein the particular first level software component comprises an operating system operating in the non-secure security state, a virtual machine operating in the non-secure security state, a secure partition operating in the secure security state or a software component operating in the realm security state.

7. The method of claim 6, wherein the particular interface of the particular hardware component comprises a hardware-based task control interface and wherein the particular first level software component comprises a task control interface driver.

8. The method of claim 7, wherein the hardware-based task control interface comprises a memory-mapped input/output interface.

9. The method of claim 1, wherein the particular interface of the particular hardware component comprises a particular task control interface of a plurality of task control interfaces, wherein the plurality of task control interfaces are directed to, under control of the additional second level software component operating in the non-secure security state, managing access to the particular hardware component for a plurality of first level software components operating in a respective plurality of particular security states.

10. The method of claim 9, wherein the respective plurality of particular security states includes the non-secure security state, a secure security state and a realm security state.

11. An apparatus, comprising: at least one processor to:
transition a particular interface of a particular hardware component to an active state responsive at least in part to a determination, at least in part via execution of a particular second level software component, that the particular interface of the particular hardware component has been configured by an additional second level software component in accordance with one or more parameters specified by the particular second level software component, wherein the additional second level software component to operate in a non-secure security state;
at least in part via execution of the particular second level software component, grant permission for a particular first level software component to access the particular interface of the particular hardware component; and
transition the particular interface of the particular hardware component from the active state to a terminated state or a disabled state responsive at least in part to one or more outstanding jobs being completed, terminated or cancelled and/or responsive at least in part to a revocation of one or more job slots;
wherein the particular second level software component to operate in the non-secure security state, a secure security state or a realm security state, wherein the particular first level software component to operate in a same security state as the particular second level software component, wherein, to transition the particular interface of the particular hardware component from the active state to a terminated state or a disabled state, the at least one processor to transition the particular interface of the particular hardware component from the active state to the terminated state or the disabled state at least in part via execution of the additional second level software component to operate in the non-secure security state.

12. The apparatus of claim 11, wherein the at least on processor further to, at least in part via execution of the particular first level software component, schedule jobs directed to the particular interface of the particular hardware component device repeatedly at least in part in response to the particular interface of the particular hardware component remaining in the active state.

13. The apparatus of claim 11, wherein the additional second level software component to operate in the non-secure security state to comprise a primary management interface driver, wherein the particular second level software component to comprise a virtualization-based security hypervisor to operate in the non-secure security state, a secure partition manager to operate in a secure security state or a realm management monitor to operate in a realm security state, wherein the particular first level software component to comprise an operating system to operate in the non-secure security state, a virtual machine to operate in the non-secure security state, a secure partition to operate in the secure security state or a software component to operate in the realm security state, and/or wherein the particular interface of the particular hardware component to comprise a task control interface.

14. The apparatus of claim 11, wherein the particular interface of the particular hardware component to comprise a particular task control interface of a plurality of task control interfaces, wherein the plurality of task control interfaces to, under control of the additional second level software component to operate in the non-secure security state, manage access to the particular hardware component for a plurality of first level software components to operate in a respective plurality of particular security states.

15. The apparatus of claim 14, wherein the respective plurality of particular security states includes the non-secure security state, a secure security state and/or a realm security state.

16. An article, comprising: a non-transitory computer-readable medium having stored thereon one or more instructions executable by a computing device to:
transition a particular interface of a particular hardware component to an active state responsive at least in part to a determination, at least in part via execution of a particular second level software component to operate in a non-secure security state, a secure security state or a realm security state, that the particular interface of the particular hardware component has been configured by an additional second level software component in accordance with one or more parameters specified by the particular second level software component, wherein the additional second level software component to operate in the non-secure security state;
at least in part via execution of the particular second level software component, grant permission for a particular first level software component to access the particular interface of the particular hardware component, wherein the particular first level software component to operate in the same security state as the particular second level software component; and
transition the particular interface of the particular hardware component from the active state to a terminated state or a disabled state responsive at least in part to one or more outstanding jobs being completed, terminated or cancelled and/or responsive at least in part to a revocation of one or more job slots;
wherein the particular second level software component to operate in the non-secure security state, a secure security state or a realm security state, wherein the particular first level software component to operate in a same security state as the particular second level software component, wherein, to transition the particular interface of the particular hardware component from the active state to a terminated state or a disabled state, the computing device to transition the particular interface of the particular hardware component from the active state to the terminated state or the disabled state at least in part via execution of the additional second level software component to operate in the non-secure security state.

* * * * *